(12) United States Patent
Sullivan

(10) Patent No.: US 7,515,138 B2
(45) Date of Patent: Apr. 7, 2009

(54) DISTINGUISHING VIBRATION SIGNALS FROM INTERFERENCE IN VIBRATION SENSING TOUCH INPUT DEVICES

(75) Inventor: Darius M. Sullivan, Cherry Hinton (GB)

(73) Assignee: 3M Innovative Properties Company, Saint Paul, MN (US)

( * ) Notice: Subject to any disclaimer, the term of this patent is extended or adjusted under 35 U.S.C. 154(b) by 621 days.

(21) Appl. No.: 10/957,234

(22) Filed: Oct. 1, 2004

(65) Prior Publication Data

US 2006/0071911 A1    Apr. 6, 2006

(51) Int. Cl.
- G06F 3/041 (2006.01)
- G06F 3/043 (2006.01)
- G06K 11/06 (2006.01)
- G08C 21/00 (2006.01)

(52) U.S. Cl. ............ 345/173; 178/18.01; 178/18.02; 178/18.03; 178/18.04; 345/177

(58) Field of Classification Search ... 178/18.01–18.04; 345/173, 177
See application file for complete search history.

(56) References Cited

U.S. PATENT DOCUMENTS

| 5,334,805 A | 8/1994 | Knowles et al. | |
| 5,646,377 A * | 7/1997 | Oda | 178/18.07 |
| 5,691,959 A | 11/1997 | Kriewall et al. | |
| 5,805,147 A * | 9/1998 | Tokioka et al. | 345/173 |
| 2001/0006006 A1 * | 7/2001 | Hill | 73/606 |
| 2002/0135570 A1 | 9/2002 | Devige et al. | |
| 2003/0066692 A1 | 4/2003 | Iisaka et al. | |
| 2003/0164820 A1 | 9/2003 | Kent | |
| 2003/0217873 A1 * | 11/2003 | Paradiso et al. | 178/18.04 |

FOREIGN PATENT DOCUMENTS

| EP | 0 656 603 | 6/1995 |
| WO | WO 00/38104 | 6/2000 |
| WO | WO 01/48684 | 7/2001 |
| WO | WO 03/005292 | 1/2003 |
| WO | WO 03/067511 | 8/2003 |

OTHER PUBLICATIONS

U.S. Appl. No. 10/440,650, "Vibration Sensing Touch Input Device", Robrecht et al., filed May 19, 2003, 22 pgs.
U.S. Appl. No. 10/739,471, "Piezoelectric Transducer", Nicholas P.R. Hill, filed Dec. 18, 2003, 20 pgs.

* cited by examiner

Primary Examiner—Sumati Lefkowitz
Assistant Examiner—Alexander S. Beck
(74) Attorney, Agent, or Firm—Steven A. Bern

(57) ABSTRACT

The present invention discloses systems and methods for use with vibration sensing touch input devices that distinguish signals derived from vibrations on a touch plate due to a touch input from signals derives from electromagnetic interference. In the present invention, the phase response of the signals due to electromagnetic interference can be inverted relative to the phase response of the signals due to vibrations in at least one signal transmission channel so that pair wise cross-correlation of the various signal channels reveals the signals caused by electromagnetic interference. Once electromagnetic interference is identified, it can be ignored or otherwise appropriately taken into account by the system.

14 Claims, 4 Drawing Sheets

DISTINGUISHING VIBRATION SIGNALS FROM INTERFERENCE IN VIBRATION SENSING TOUCH INPUT DEVICES

The present invention relates to touch input devices that utilize vibrations propagating in a touch plate to determine information relating to the touch input.

BACKGROUND

Touch input devices can provide convenient and intuitive ways to interact with electronic systems including computers, mobile devices, point of sale and public information kiosks, entertainment and gaming machines, and so forth. Various touch input device technologies have been developed including capacitive, resistive, inductive, projected capacitive, surface acoustic wave, infrared, force, and others. It is also possible to form a touch input device from a touch plate provided with vibration sensors that detect vibrations propagating in the touch plate due to a touch input and determine the touch location from the detected vibrations.

SUMMARY

The present invention provides a touch input device that includes a plurality of vibration sensors mechanically coupled to a touch plate and configured to generate vibration signals in response to vibrations propagating in the touch plate due to a touch input, and to communicate the vibration signals to controller electronics through associated signal transmission channels. The vibration sensors and transmission channels are oriented so that cross-correlating signals received on the transmission channels distinguishes vibrations signal from signals caused by electromagnetic interference. In some embodiments, a portion of the vibration sensors can be inverted relative to other vibrations sensors. In some embodiments, the connections of a portion of the transmission channels to their associated vibration sensors can be inverted relative to the other transmission channel connections.

The present invention also provides a method for determining information related to a touch input in a system that includes a plurality of vibration sensors coupled to a touch plate for detecting vibrations in the touch plate due to the touch input and generating corresponding vibration signals that are communicated to controller electronics via signal transmission channels associated with the vibration sensors. The method includes inverting a phase response to vibration signals relative to signals caused by electromagnetic interference in a portion of the transmission channels, and cross-correlating signals received on the transmission channels to distinguish vibration signals from electromagnetic interference.

The present invention further provides a method of making a vibration sensing touch input device, including coupling a plurality of vibration sensors to a touch plate, orienting the vibration sensors so that a portion of the vibration sensors are inverted with respect to a feature of the touch plate relative to the other vibration sensors, electrically connecting the vibration sensors to controller electronics through transmission channels associated with each vibration sensor, the controller electronics being configured to cross-correlate signals received on each transmission channel, and providing for inverting signals communicated to the controller through the transmission channels associated with the inverted vibration sensors.

BRIEF DESCRIPTION OF THE DRAWING

The invention may be more completely understood in consideration of the following detailed description of various embodiments of the invention in connection with the accompanying drawings, in which.

Figure 1:
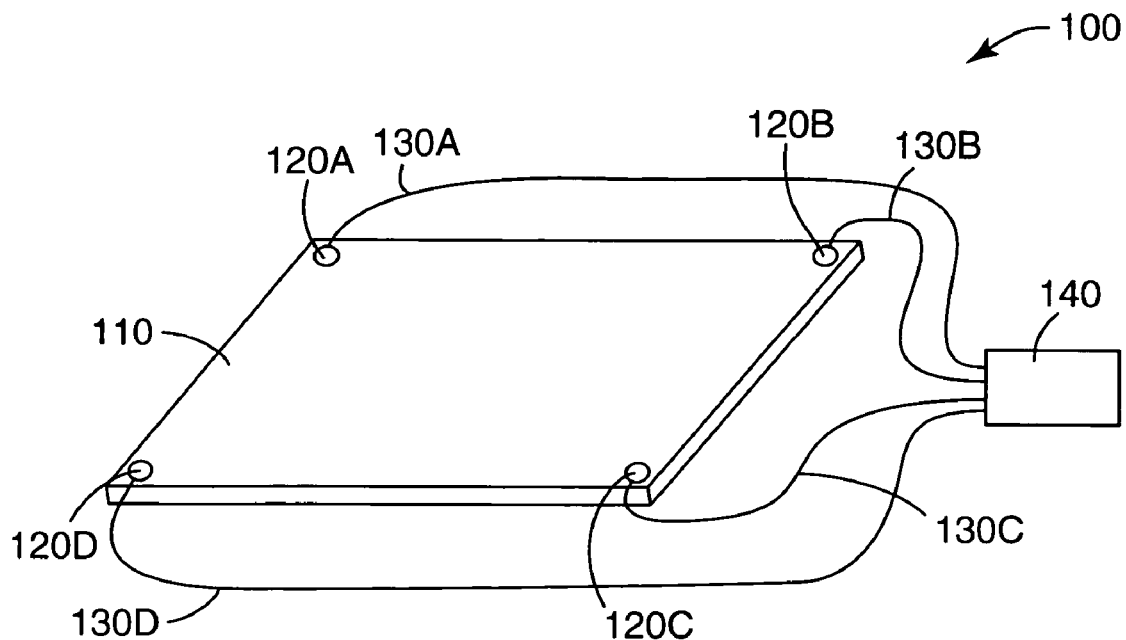
FIG. 1 schematically illustrates a vibration sensing touch input device.

While the invention is amenable to various modifications and alternative forms, specifics thereof have been shown by way of example in the drawings and will be described in detail.

DETAILED DESCRIPTION

The present invention relates to vibration sensing touch input devices that utilize vibration sensors, for example piezoelectric transducers, to detect vibrations propagating in a touch plate, thereby generating signals that can be used to determine information related to the touch input, such as the touch location on the touch plate. The present invention provides a method for orienting the vibration sensors and signal transmission channels so that the signals derived from mechanical disturbances in the touch plate can be distinguished from unwanted electromagnetic interference that might otherwise be erroneously interpreted as a mechanical disturbance. The method can be suitably applied when the controller electronics used to process the signals cross-correlates signals from various pairs (or other multiples) of the vibration sensors and looks at the positions of the peaks in the corresponding correlation functions to determine touch position.

The invention overcomes the problem that, with signal transmission channels of uniform phase response, sources of electromagnetic interference and sources of mechanical disturbance may not be easily distinguished. The invention reduces the likelihood of a vibration sensing touch input device mistaking a source of electromagnetic interference for a source of mechanical vibrations on the panel by modifying the response of the system so that electromagnetic interference can be distinguished from mechanical disturbances. This allows the system to ignore or otherwise appropriately deal with any interference signals.

A source of electromagnetic interference positioned close to a vibration sensing touch input device may contribute unwanted noise into two or more signal channels. The electronic noise can enter the measurement system via the transmission wires connecting the sensors to the controller's circuit-board. This type of noise is strongly correlated, meaning that systematic contributions to the correlation function that cross-correlates signals from various pairs of vibration sensors can be expected. The signals due to interference are therefore highly susceptible to being mistaken for valid signals from a source of mechanical disturbance such as touch plate vibrations caused by a touch input.

There are several potential sources of electromagnetic interference. One is radiated noise such as periodic signals generated by a switch mode DC-DC converter. This could be either inside or outside an associated display device. Inside LCD displays, a DC-DC converter is generally used to step up the voltage for powering a backlight. There may also be other similar switching converters to change voltage levels in the electronics running the display. Outside the display, similar converters may be used in other electronics placed nearby, in which case noise may be radiated from the other electronics and picked up by signal transmission channels. Electronics (including the display) that run off a DC voltage are often powered by an AC to DC voltage converter that often contains a switching circuit to give the required voltage level at high efficiency, which may produce interference.

Digital signals, either from processing or communications and control usually involve fast switching between voltage levels. These digital signals can radiate noise that can be picked up. Such noise can originate from internal electronics of the display, from video signals within or outside the display, from digital processing on the touchscreen controller, from an external PC or other digital equipment, and so forth. A CRT uses magnetic coils to direct the electron beam. The signals to these coils can vary quickly, particularly the horizontal sweeping coil. Such coil has a sawtooth waveform applied to it to gradually sweeps the electron beam across the face of the monitor and then bring it sharply back to the start of the sweep. This creates a sharp change in current, which will radiate noise that may be picked up. The plasmas created in a plasma screen generally radiate electromagnetic noise that can be picked up.

Conducted noise is another type that can be picked up in touch input devices of the present invention to cause interference. In addition to the noise sources discussed above, conducted noise may be present on the ground or power connections to the touchscreen controller. Such noise may be conducted into the signal channels down the electric tail attached to the sensor, directly to an amplifier circuit associated with a vibration sensor, or farther down the signal channel (for example, in the controller. Efforts to minimize this noise can be made, for example by smoothing or regulation of the power supply. However such conducted noise is still possible, and can be distinguished in accordance with the present invention.

Electrostatic discharge (ESD) onto a metal bezel can also create noise that is picked up. In the case of a discharge, then both conducted and radiated noise will be present. Conducted noise coupled through the ground connection would likely dominate in the case of ESD, but that can depend on the precise configuration of the circuit. Even in the situation of no actual discharge, such any high voltage producing event can give rise to radiated noise pickup.

Distinguishing between signals derived from mechanical disturbances that may be due to a touch and signals derived from correlated electromagnetic interference can be achieved by arranging the vibration sensors on the touch plate so that the phase response to vibrations of at least one vibration sensor is modified with respect to the others, but the phase response of all transmission channels to electromagnetic interference is identical. Alternatively, all the vibration sensors may have an identical phase response to measured vibrations, but at least one signal transmission channel has a different phase response to electromagnetic interference. More generally, the phase difference between the mechanical response of the vibration sensors and the electrical response of the corresponding transmission channel is non-uniform over the ensemble of channels that communicate signals to the controller for cross-correlation.

Vibration sensors such as piezoelectric transducers often have a special axis that is characteristic of the phase of the output of the sensor. The orientation of this axis with respect to some geometrical feature of the touch plate (e.g., a corner, edge or face) determines the phase relationship between the mechanical quantity being measured by the sensor and the output of the sensor. For example, an inversion of the sensor axis produces a corresponding inversion of the sensor output. In one embodiment, two or more vibration-sensors are mounted on the panel with at least one sensor having a different orientation of its axis than that of another sensor. In another embodiment, two or more vibrations sensors are mounted on the panel with their axes orientated identically to some geometrical feature of the panel, and the electrical connection configuration to at least one vibration sensor is different than that of another sensor so that the corresponding signal transmission channels have different phase responses to vibrations.

The configurations described can generate signals that allow the controller electronics to distinguish unwanted sources of electromagnetic interference from sources of mechanical disturbance that may be indicative of a touch input. Therefore, without necessitating the elimination of electromagnetic interference signal contributions, the present invention allows the processor electronics to recognize signals due to electromagnetic interference and treat them accordingly. In some embodiments, the signals recognized as due to electromagnetic interference can be ignored.

The present invention can be implemented using a vibration sensing touch input device 100 schematically shown in FIG. 1. Vibration sensing touch input device 100 includes vibration sensors 120A-120D coupled to a touch plate 110, and controller electronics 140 adapted to receive signals from the vibration sensors through signal lines 130A-130D. Vibrations sensors 120A-120D are adapted to detect vibrations propagating in the touch plate, which may be caused by mechanical disturbances due to the contact or frictional movement of a touch implement on the touch plate. The sensed vibrations are converted into signals that can be digitized and cross-correlated so that the controller can use them to determine the position of the touch input, for example as described in WO 01/48684 and WO 03/005292, both of which are wholly incorporated into this document.

For illustrative purposes, FIG. 1 shows four vibration sensors, one in each corner of a rectangular touch plate, although fewer or more vibration sensors can be used, and they can be placed in various different arrangements. When the touch plate is intended for use over a display so that the display is viewable through the touch plate, placement of the vibration sensors out of the field of view may be desired, for example near the corners or edges of the touch plate. Because the detected vibrations generally include bulk vibrations (not confined to the touch plate surface), the vibration sensors can be mounted either on the top (touch) surface of the touch plate, or on the rear surface of the touch plate.

The vibration sensors can be any sensor capable of detecting vibrations propagating in the touch plate. Piezoelectric materials may provide exemplary vibrations sensors. The vibration sensors 120A-120D can be bonded to touch plate 110 by any suitable means, for example using an adhesive, solder, or other suitable material, so long as the mechanical coupling achieved is sufficient for vibrations propagating in the touch plate can be detected by the vibration sensors.

Exemplary vibration sensors and vibration sensor arrangement are disclosed in co-assigned U.S. patent applications Ser. No. 10/440,650 and U.S. Ser. No. 10/739,471, which are fully incorporated into this document.

The touch plate 110 can be any material capable of supporting the vibrations to be sensed. Preferably, touch plate 110 is a rigid plate, and can be any suitable material such as glass, plastic (polyacrylate, polycarbonate, etc.), wood, cardboard, metal, or the like. The touch plate can be transmissive of visible light or not depending on the application. At least some degree of transmission of visible light is desirable when a displayed image is meant to be viewed through the touch sensor. The touch plate can also incorporate static graphics (permanent or removable, laminated or otherwise attached, or held in close proximity, and positioned either above or below the touch plate), whether or not the touch sensor is used in conjunction with a display viewable through the touch plate. The touch plate can also be configured to have an image projected onto it. The touch plate can also incorporate a roughened front surface that can assist in creating detectable vibrations as a user drags a finger or other touch implement across the surface. A roughened surface can also provide glare reduction.

Figure 2:
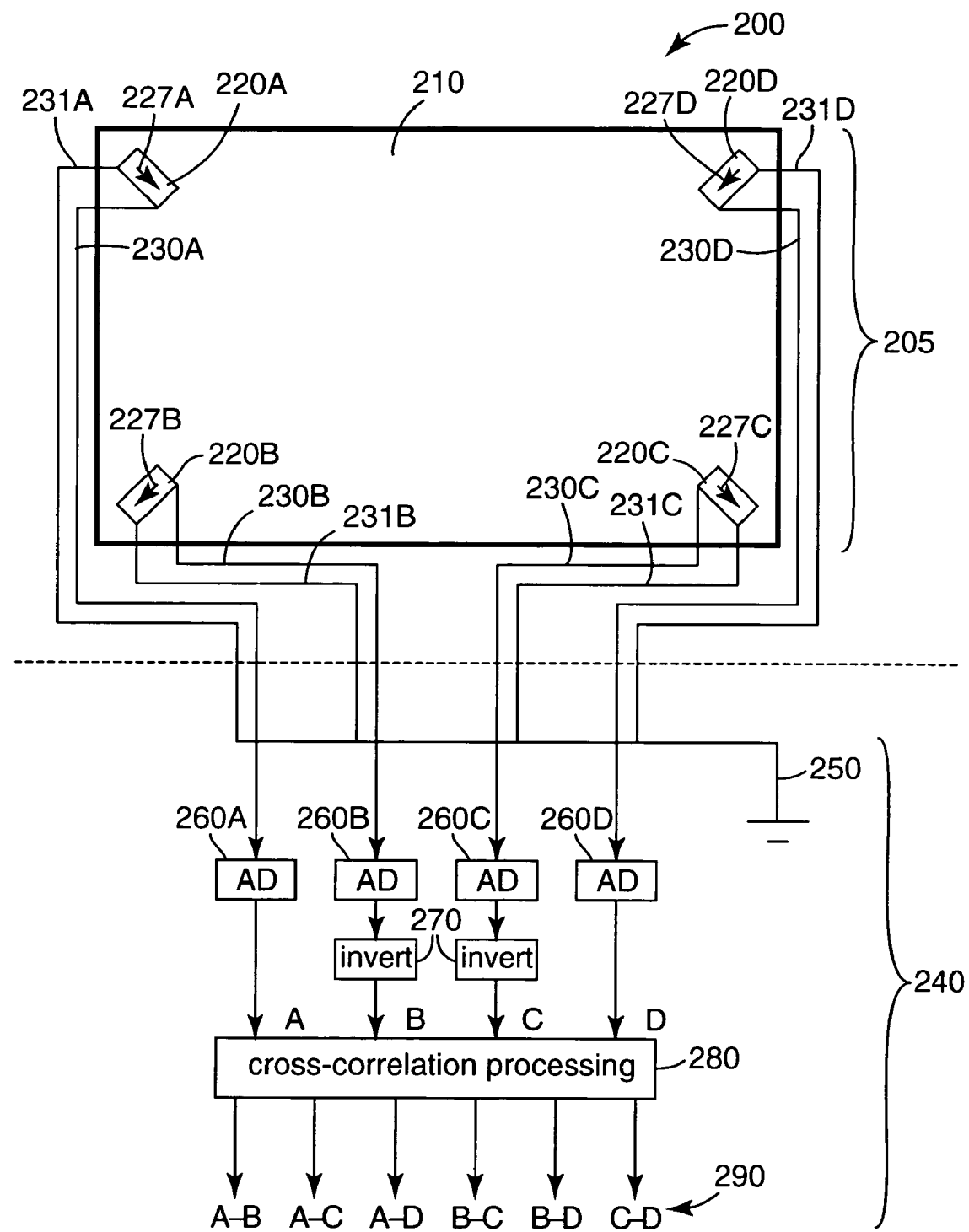
FIG. 2 schematically illustrates an embodiment of a vibration sensing touch input device according to the present invention.

According to the present invention, a vibration-sensing touch input device can be constructed so that the response to signals derived from touch plate vibrations can be distinguished from the response to signals derived from electromagnetic interference. FIG. 2 schematically illustrates one embodiment. Touch input system 200 includes a vibration-sensing touch sensor 205 and a controller 240. The touch sensor 205 includes a touch plate 210 and four vibration sensors 220A-220D. Each vibration sensor is connected to a signal line 230A-230D and a ground line 231A-231D that connects to an internal ground 250 in the controller 240. The signal lines and ground lines can be wires or printed traces, can be connected (for example through a tail attached to the touch plate, not shown) to a cable (not shown) that communicates the signals to the controller. The signal from each transducer may be amplified by circuits located nearby on the plate (not shown). Each signal line 230A-230D is routed to a corresponding analog to digital converter (ADC) 260A-260D in the controller 240. The digitized signals are then used as inputs in a cross-correlation processor 280 whose outputs are various correlation functions 290, which represent cross-correlations among the various pair-wise combinations of digitized signals, denoted A-B, A-C, A-D, B-C, B-D and C-D.

In touch system 200, each transducer 220A-220D is shown to have an axis of orientation 227A-227D. The orientation axis of each transducer determines the detected phase of the measured plate vibrations. As shown, the axes of all the transducers are orientated at 45° to both edges meeting at the respective corner of the touch plate 210. For two of the transducers, transducer 220A and transducer 220D, the axes 227A and 227D point towards the main body of the touch plate 210. For the other two transducers, transducer 220B and transducer 220C, the axes 227B and 227C point away from the main body of the touch plate 210. The phase response to vibrations is therefore inverted in transducers 220A and 220D with respect to transducers 220B and 220C. Other ways of inverting the phase response of one transducer versus another include mounting one transducer on the top surface of the touch plate and another transducer on the bottom surface of the touch plate, as well as those illustrated by FIGS. 3(a) and 3(b) and discussed below. Inside the controller 240, the transmission channels associated with transducers 220B and 220C are phase-inverted using inverters 270 (which can be accomplished through hardware or firmware) so that all transmission channels again become uniform in their response to vibrations and become non-uniform in their response to electromagnetic interference. It should be noted that in the illustrated arrangement, either the transmission channels associated with transducers 220B and 220C or the transmission channels associated with transducers 220A and 220D can be inverted.

When a transducer is oppositely oriented relative to other transducers, using an inverter in its signal transmission channel reverses the effects of the opposite orientation so that the method of determining the touch position from peaks in the correlation function remain unchanged. Electromagnetic interference is not sensitive to transducer orientation, however, so that the phase of the electromagnetic interference is the same on all transmission channels. The inverter therefore causes the electromagnetic signal to be inverted relative to non-inverted transmission channels while reversing the inversion of vibration signals that was imposed by the transducer orientation. As such, the mechanical signals detected on the touch plate are processed as if unchanged, whereas any electromagnetic interference that is picked up is changed to opposite sign. In the correlation function, all the mechanical signals will thus give positive peaks (due to the signals having the same sign given the inverter in combination with the reversed poling), whereas the peaks in the correlation function due signals derived from electromagnetic interference will produce a different situation. When comparing an inverted channel with a non-inverted channel, the result is a negative peak. When there are four channels, two of which are inverted, this results in four cross-correlations that will result in negative peaks. So by looking at one or more of these four combinations, a positive peak signifies a vibration signal and a negative peak signifies interference that can be ignored.

Figure 3A:
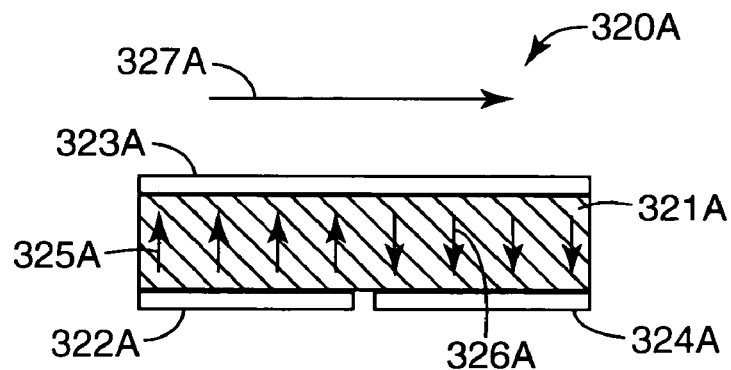
FIGS. 3(a) and (b) schematically illustrate the determination of an orientation axis for different piezoelectric transducers useful in the present invention.

The axis of the characteristic phase response of a vibration sensor such as a piezoelectric transducer is defined by the poling of the piezoelectric material in the transducer and the arrangement of the electrodes on the sensor. In an exemplary embodiment, the transducers has a serial poling arrangement as schematically shown in FIG. 3(a) and as described in co-assigned U.S. Ser. No. 10/739,471, identified above, whereby the vibration sensor 320A includes a piezoelectric material 321A having a first region exhibiting a first poling direction 325A pointing from bottom to top and second, adjacent region exhibiting a second poling direction 326A pointing from top to bottom. A first contact electrode 322A connects to the first region on the bottom surface, a second contact electrode 324A connects to the second region on the bottom surface, and a common electrode 323A connects the first and second regions together on the top surface. The phase response axis 327A is determined by the direction of voltage response upon stressing the sensor, which in this case points from left to right in FIG. 3(a). For this type of vibration sensor, when it is mounted in the corner of the touch plate, the phase response axis is preferably orientated parallel to the plane of the touch plate and at 45° to each of the touch plate edges that meet at the corner. The axis may then be directed to point either towards the body of the substrate or towards the corner of the substrate, for example as indicated for the vibration sensors 220A-220D in FIG. 2.

Figure 3B:
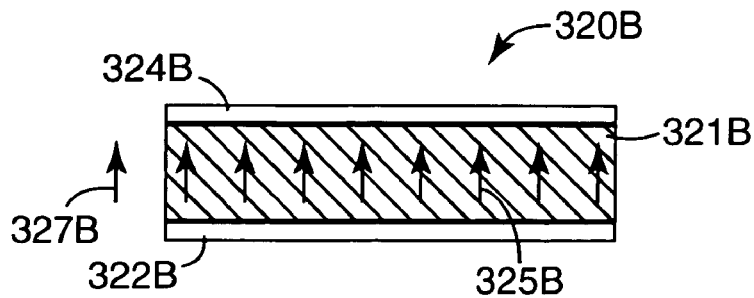

In another embodiment, a more conventional piezoelectric transducer can be used, such as a so-called "unimorph" device. FIG. 3(b) schematically illustrates such a device 320B that includes a piezoelectric material 321B uniformly poled in a single direction 325B. A first contact electrode 322B is disposed on the bottom of the device 320B, and a second contact electrode 324B is disposed on the top of the device. The phase response axis 327B points in the same direction as the uniform poling direction 325B. This type of sensor is preferably mounted so that the phase response axis is perpendicular to the plane of the touch plate. The sensor may be oriented so that the axis is directed either towards the touch plate or away from the touch plate. For example, in FIG. 2, vibration sensors 220A and 220D could be oriented with their phase response axes pointing up, away from the touch plate, and vibration sensors 220B and 220C could be oriented with their phase response axes pointing down, toward the touch plate.

Figure 4:
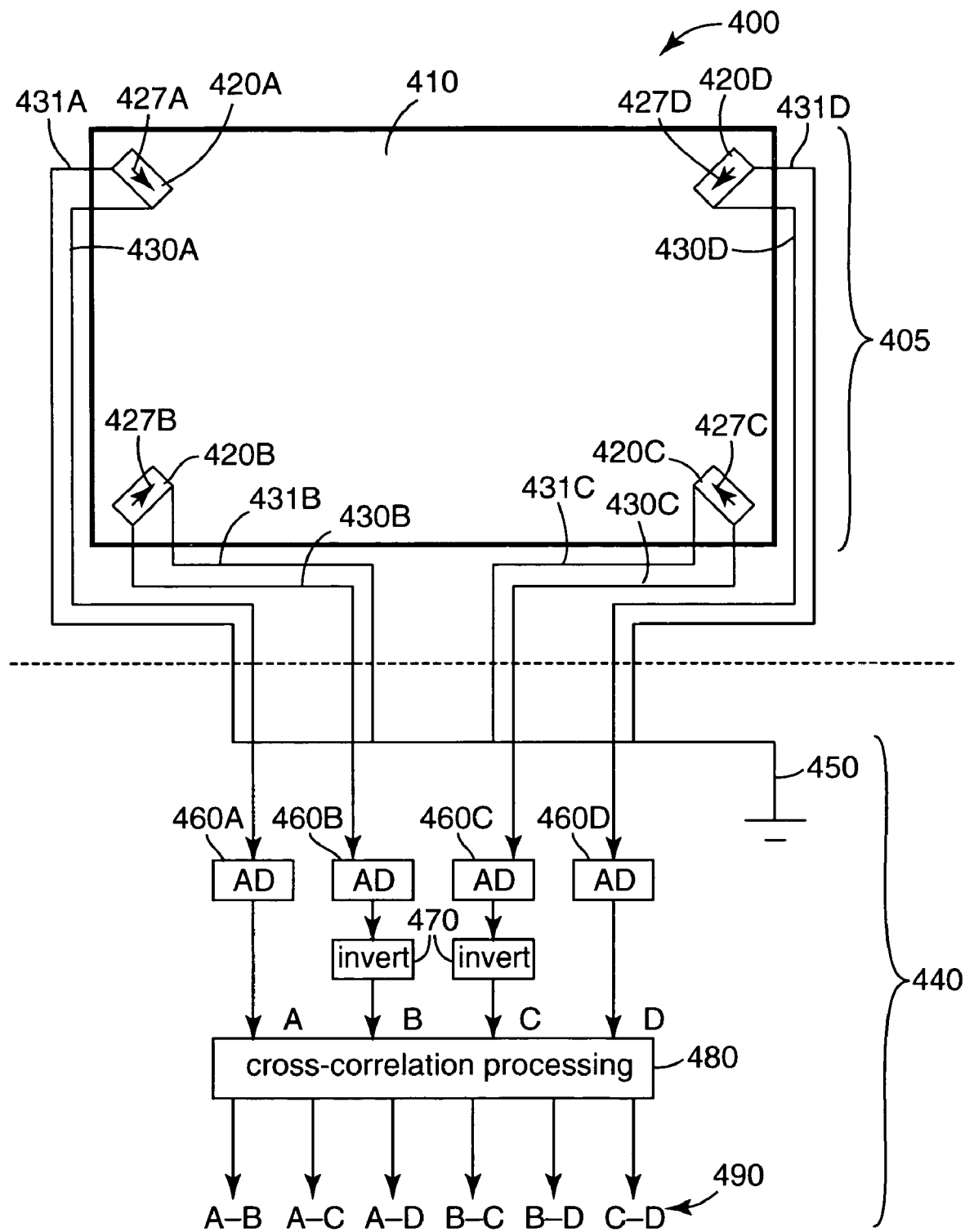
FIG. 4 schematically illustrates an embodiment of a vibration sensing touch input device according to the present invention.

FIG. 4 schematically illustrates another embodiment of a vibration-sensing touch input system 400 where the response to signals derived from touch plate vibrations can be distinguished from the response to signals derived from electromagnetic interference. Touch input system 400 includes a vibration-sensing touch sensor 405 and a controller 440. The touch sensor 405 includes a touch plate 410 and four vibration sensors 420A-420D. Each vibration sensor is connected to a signal line 430A-430D and a ground line 431A-431D that connects to an internal ground 450 in the controller 440. Each signal line 430A-430D is routed to a corresponding ADC 460A-460D in the controller 440. The digitized signals are then used as inputs in a cross-correlation processor 480 whose outputs are various correlation functions 490, which represent cross-correlations among the various pair-wise combinations of digitized signals, denoted A-B, A-C, A-D, B-C, B-D and C-D.

In touch system 400, each transducer 420A-420D is shown to have an axis of orientation 427A-427D. As shown, the axes of all the transducers are oriented at 45° to both edges meeting at the respective corner of the touch plate 410, and are all pointing toward the main body of the touch plate 410. The signal lines 430B and 430C are reversed relative to signal lines 430A and 430D. Therefore, inside the controller 440, the signals received from transducers 420B and 420C have phase responses to vibrations that are opposite to those of the signals received from transducers 420A and 420D. Inside the controller 440, the transmission channels associated with transducers 420B and 420C are phase-inverted using inverters 470 so that all transmission channels again become uniform in their response to vibrations and become non-uniform in their response to electromagnetic interference. The result is a cross-correlation phase response to electromagnetic interference that is inverted relative to the cross-correlation phase response due to signals derived from mechanical vibrations in the touch plate in a manner that is analogous to modified response provided in system 200 shown in FIG. 2. It should be noted that in the illustrated arrangement, either the transmission channels associated with transducers 420B and 420C or the transmission channels associated with transducers 420A and 420D can be inverted.

In the arrangement shown in FIGS. 2 and 4, a source of electromagnetic interference may behave like a voltage source capacitively coupled to the signal wires. The contribution of the noise source to the digitized signals would be expected to be of uniform phase on all four channels. From the four transducers, for example 220A, 220B, 220C and 220D in FIG. 2, six cross-correlation functions can be calculated (A-B, A-C, A-D, B-C, B-D and C-D). In FIG. 2, four of these correlation functions derive from pairs of oppositely oriented transducers, namely A-B, A-C, B-D and C-D, and the remaining two correlation functions derive from pairs of identically orientated transducers, namely A-D and B-C. In FIG. 4, the A-B, A-C, B-D and C-D correlation functions derive from pairs of oppositely oriented signal lines due to the signal inversion in channels B and C, whereas the A-D and B-C correlation function derive from pairs of identically oriented signal lines. In normal operation, the processor examines the correlation functions for positive peaks. The position of these peaks may reveal the position of a source of mechanical vibrations.

The cross-correlation peaks are generated from data sets, collected by the analog to digital converters (260A-260D in FIGS. 2 and 460A-460D in FIG. 4), the data sets being inverted where necessary (as shown in FIGS. 2 and 4). For each channel associated with a vibration sensor, an array of N consecutive data samples, denoted $w_X$ for an arbitrary channel X, is gathered simultaneously and, where necessary, inverted. In the systems shown in FIGS. 2 and 4, the inversion is applied to the data associated with the B and C channels, denoted $w_B$ and $w_C$. The conventional cross correlation function $G_{XY}$ may then be obtained by the following steps.

1) Perform a Fourier transform on two data arrays, $w_X$ and $w_Y$ to arrive at $\hat{w}_X$ and $\hat{w}_Y$ as indicated by the equations below. The data may first be "padded" with zeros to avoid wraparound effects (see Chapter 13.1, *Numerial Recipes in C* by Press et al., Second Edition 1997, Cambridge University Press).

$$\hat{w}_X(j) = \sum_{k=0}^{N-1} w_X(k) \exp\left(\frac{2\pi i j k}{N}\right)$$

$$\hat{w}_Y(j) = \sum_{k=0}^{N-1} w_Y(k) \exp\left(\frac{2\pi i j k}{N}\right)$$

2) Combine the two Fourier transformed data sets:

$$\hat{G}_{XY}(j) = \hat{w}_X(j)\hat{w}_Y(j)$$

3) Inverse Fourier transform the result to obtain the cross-correlation function:

$$G_{XY}(j) = \frac{1}{N}\sum_{k=0}^{N-1} \hat{G}_{XY}(k)\exp\left(-\frac{2\pi i j k}{N}\right)$$

A dispersion-correction may optionally be applied to $\hat{G}_{XY}$ before step 3 that transforms the data from the "frequency domain" to the "wavevector domain" as disclosed in WO 03/005292.

Figure 5:
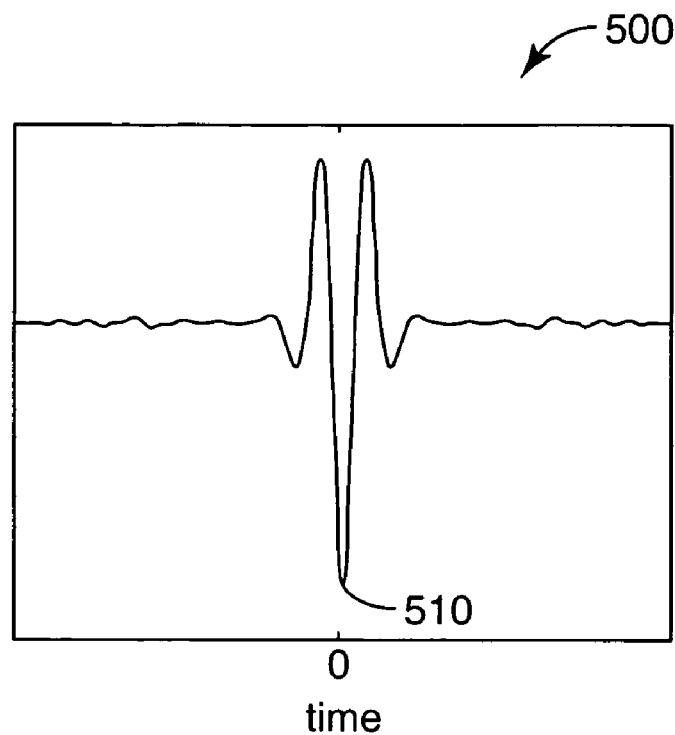
FIG. 5 illustrates a graph of a correlation function resulting from cross-correlation of signals in a vibration sensing touch input device of the present invention.

FIG. 5 shows an example of a graph of a correlation function 500 derived from signals generated in a touch system like that shown in FIG. 2 or 4 that includes oppositely oriented transducers and/or inverted signal channels. The correlation function may be corrected for the effects of dispersive propagation of bending wave signals, for example as described in WO 03/005292. In the presence of a source of electromagnetic interference, the signals produce a correlation function as shown in graph 500 that exhibits a strong, central, negative peak 510. A source of mechanical vibrations would have registered a positive peak in a touch system like system 200 in FIG. 2 or system 400 in FIG. 4. As such, the peak 510 indicates that the signals were due to electromagnetic interference and not a touch input, and the data can be ignored.

Surrounding the central, negative peak in FIG. 5 are two positive peaks. It is preferable that the controller does not interpret these positive peaks as sources of mechanical vibrations. To this end, the controller may be programmed to ignore any positive peak whose magnitude is less than that of the central value of the correlation function. Alternatively or additionally, the positive peak positions in three or more correlation functions may be analyzed for consistency with a single hypothetical location on the panel. In general, the positions of positive peaks due to interference will not be consistent with a single hypothetical location.

Figure 6:
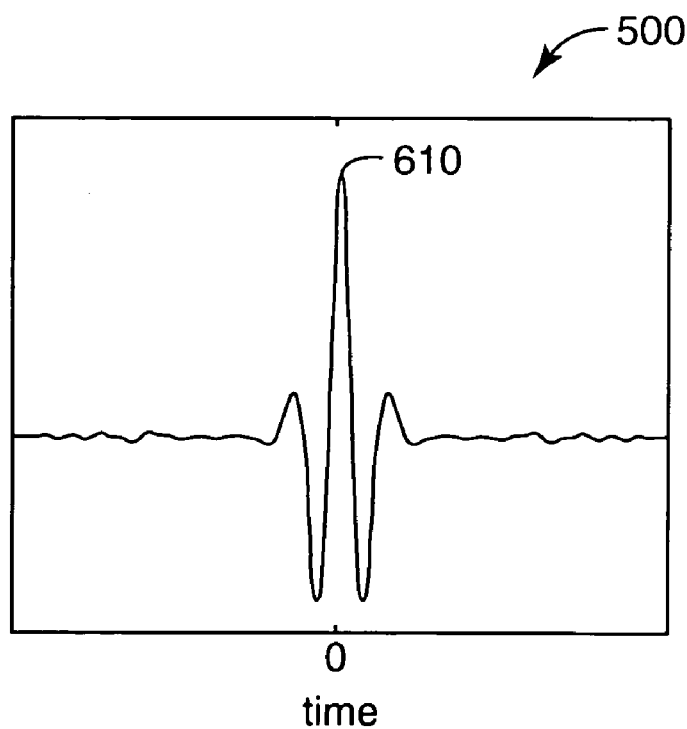
FIG. 6 illustrates a graph of a correlation function resulting from cross-correlation of signals in a vibration sensing touch input device of the present invention.

FIG. 6 shows a graph of a correlation function 600 derived from signals generated in a touch system that includes identically oriented transducers and no transmission channel inversion. The graph 600 shows a strong, central, positive peak 610. In the presence of a source of electromagnetic interference, the correlation function would show a strong positive peak, and a source of mechanical vibrations would also register a positive peak in this system. It is therefore not apparent from this correlation function whether the peak is present due to interference or mechanical vibrations.

In systems of the present invention, the controller may be programmed to infer the presence of electromagnetic interference by identifying large negative values in the correlation functions. The controller may be programmed to subsequently apply signal processing methods to reduce the contribution of electromagnetic interference. Such methods may include adaptive noise cancellation, finite impulse response (FIR) or infinite impulse response (IIR) digital filtering of the input signals (FIR and IIR are known digital signal processing techniques and described in the text *Numerical Recipes in C*, which is referenced above), and normalization of the amplitudes of data in the Fourier domain.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A touch input device comprising: a plurality of vibration sensors mechanically coupled to a touch plate and configured to generate vibration signals in response to vibrations propagating in the touch plate due to a touch input, and to communicate the vibration signals to controller electronics through associated signal transmission channels, wherein there is a relative orientation between the vibration sensors and their associated transmission channels so that cross-correlating signals received on the transmission channels distinguishes vibration signals from signals caused by electromagnetic interference.

2. The touch input device of claim 1, wherein the controller electronics are configured to determine touch input location from the vibration signals.

3. The touch input device of claim 1, wherein the vibration sensors are piezoelectric transducers.

4. The touch input device of claim 1, wherein each vibration sensor has an orientation direction, and one or more of the vibration sensors are positioned with orientation directions inverted with respect to a feature of the touch plate and relative to the orientation directions of the other vibration sensors.

5. The touch input device of claim 4, wherein the signal transmission channels associated with the one or more vibration sensors positioned with inverted orientation directions include a signal inverter.

6. The touch input device of claim 1, wherein one or more of the signal transmission lines are inverted with respect to a connection with their associated vibrations sensors and relative to the orientations of the other signal transmission lines.

7. The touch input device of claim 6, wherein the inverted signal transmission lines further include a signal inverter.

8. The touch input device of claim 1, wherein the vibration sensors are four rectangular piezoelectric transducers having orientation directions pointing in a plane parallel to the touch plate, the touch plate being rectangular, each piezoelectric transducer located in a different corner of the touch plate, two of the piezoelectric transducers having orientation directions pointing toward the center of the touch plate and the other two piezoelectric transducers having orientation directions pointing away from the center of the touch plate.

9. The touch input device of claim 1, wherein the vibration sensors are piezoelectric transducers having orientation directions pointing in a direction perpendicular to the touch plate, at least one of the piezoelectric transducers having an orientation direction pointing toward the touch plate and the other piezoelectric transducers having orientation directions pointing away from the touch plate.

10. The touch input device of claim 1, wherein the vibration sensors are piezoelectric transducers positioned with the same orientation relative to a feature of the touch plate, at least one of the piezoelectric transducers coupled to one side of the touch plate and the other piezoelectric transducers coupled to the other side of the touch plate.

11. A method for determining information related to a touch input in a system that includes a plurality of vibration sensors coupled to a touch plate for detecting vibrations in the touch plate due to the touch input and generating corresponding vibration signals that are communicated to controller electronics via signal transmission channels associated with the vibration sensors, the method comprising: inverting a phase response to vibration signals relative to signals caused by electromagnetic interference in a portion of the transmission channels; and cross-correlating signals received on the transmission channels to distinguish vibration signals from electromagnetic interference.

12. The method of claim 11, wherein the step of inverting a phase response comprises orienting a portion of the vibration sensors to have an inverted response to vibrations as compared to the other vibration sensors, and phase inverting the signals communicated to the controller electronics via the signal transmission channels associated with the vibration sensors oriented to have the inverted response.

13. The method of claim 11, wherein the step of inverting a phase response comprises inverting a connection of a portion of the signal transmission channels at their associated vibration sensors relative to the other signal transmission channels, and inverting the signals communicated to the controller electronics via the inverted signal transmission channels.

14. A method of making a vibration sensing touch input device comprising: coupling a plurality of vibration sensors to a touch plate; orienting the vibration sensors so that a portion of the vibration sensors are inverted with respect to a feature of the touch plate relative to the other vibration sensors; electrically connecting the vibration sensors to controller electronics through transmission channels associated with each vibration sensor, the controller electronics configured to cross-correlate signals received on each transmission channel; and providing for inverting signals communicated to the controller through the transmission channels associated with the inverted vibration sensors.

* * * * *